United States Patent [19]
Esten

[11] 3,799,496
[45] Mar. 26, 1974

[54] PILOT OPERATED CONTROL VALVE

[76] Inventor: Harold Esten, 73 Messenger La., Willingboro, N.J. 08046

[22] Filed: Apr. 22, 1971

[21] Appl. No.: 136,432

[52] U.S. Cl. .................... 251/30, 251/46, 137/98
[51] Int. Cl. .................. F16k 31/385, F16k 31/40
[58] Field of Search ............ 251/30, 45, 46; 137/82

[56] References Cited
UNITED STATES PATENTS

| 269,886 | 1/1883 | Semple | 251/46 |
|---|---|---|---|
| 3,004,546 | 10/1961 | Robins et al. | 137/82 |
| 3,221,609 | 12/1965 | Frantz | 251/30 X |
| 3,256,900 | 6/1966 | Estes et al. | 251/140 X |
| 2,573,369 | 10/1951 | Snoddy | 251/46 X |
| 3,005,616 | 10/1961 | Seele | 251/46 |
| 3,362,679 | 1/1968 | Le Wan | 251/30 X |
| 3,405,906 | 10/1968 | Keller | 251/30 |
| 3,424,427 | 1/1969 | Ruchser | 251/30 |
| 3,477,466 | 11/1969 | Sturm | 251/30 X |
| 3,495,804 | 2/1970 | Muller et al. | 251/30 X |
| 3,519,022 | 7/1970 | Chung et al. | 251/30 X |
| 3,540,462 | 11/1970 | Renzi | 251/30 X |
| 3,620,658 | 11/1971 | Tappin | 251/30 X |

FOREIGN PATENTS OR APPLICATIONS

| 1,110,895 | 10/1955 | France | 251/30 |

OTHER PUBLICATIONS

West German Printed Application 1,038,856 9-1958, Burkert, 251-30,

West German Printed Application 1,550,321 5-1969, Hess, 251-30.

*Primary Examiner*—Arnold Rosenthal
*Attorney, Agent, or Firm*—Caesar, Rivise, Bernstein & Cohen

[57] ABSTRACT

A pilot operated control valve for limiting flow in a main line, a diaphragm positioned adjacent said main line, said diaphragm having an orifice leading into a poppet chamber having an opening, a poppet passing through said opening, and projecting into said poppet chamber whereby the effective area of said opening is changed by the movement of said poppet, said opening leading to a control chamber and outlet means connecting with the main flow. A small portion of the main flow is diverted through the diaphragm orifice, through the poppet opening and then into the control chamber to return to the main flow through the outlet. The main flow can be varied in accordance with the effective opening into the control chamber as defined by the position of the poppet in order to achieve an electrohydraulic servo valve, a pressure regulator or a pressure balance valve.

2 Claims, 14 Drawing Figures

INVENTOR
HAROLD ESTEN

BY
Caesar, Rivise
Bernstein and Cohen
ATTORNEYS

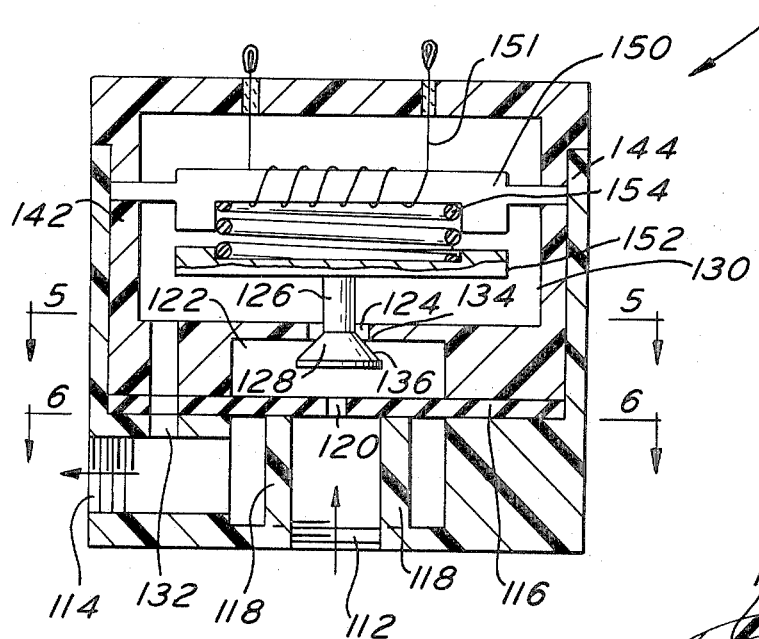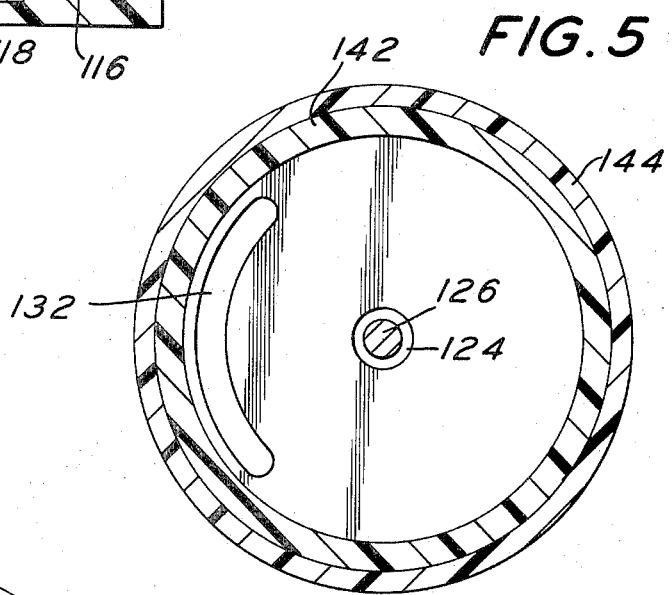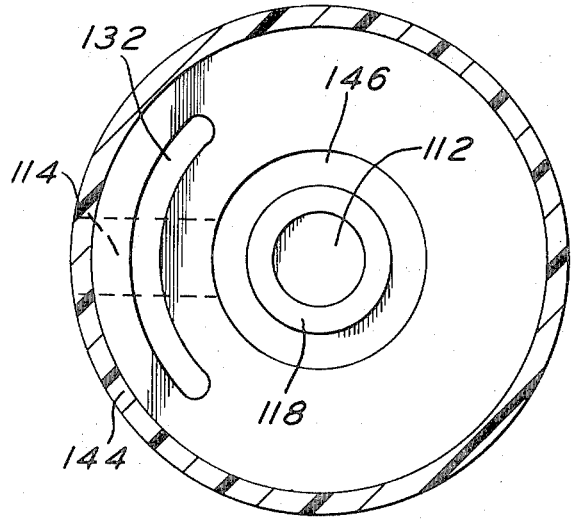

INVENTOR
HAROLD ESTEN

BY
Calsar, Rurse
Bernstein and Cohen
ATTORNEYS

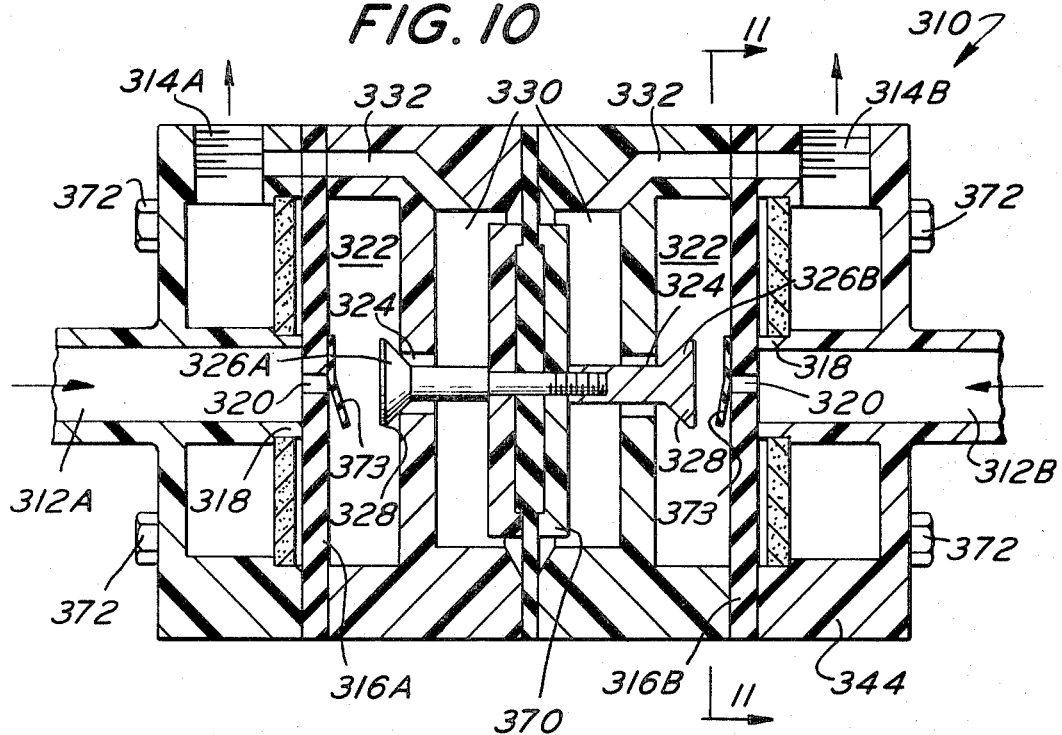
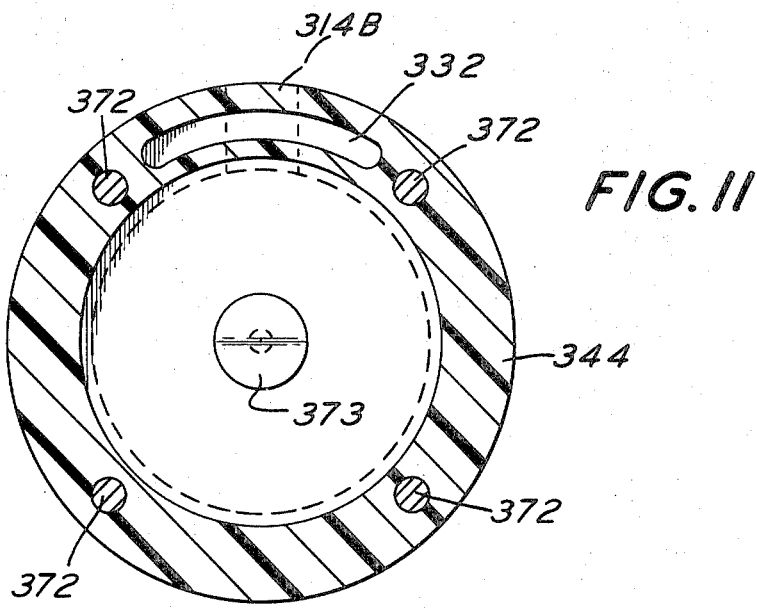

INVENTOR
HAROLD ESTEN

PILOT OPERATED CONTROL VALVE

This invention relates to a pilot operated control valve and more particularly has as its objective the provision of a new and improved device of this general class.

There are a large number of control valves on the market and in the literature wherein the control element is generally motivated by a complex combination of springs or other components that tend to wear out as time goes by.

Towards this end the present invention provides a pilot operated control valve which achieves the following:

1. The control of large amounts of power by the direct application of small amounts of power.
2. Extreme accuracy of regulation with respect to the inlet pressure to the control valve and flow rate from the control valve.
3. Extreme accuracy of controlled pressures for large differences in supplied pressure.
4. Shut-off occurs without the necessity of any parts that are in sliding frictional contact with each other, thereby extending the life of the device greatly.

In view of the foregoing, the valve of the present invention can perform as follows:

1. As an electrohydraulic servo valve.
2. As a pressure regulator.
3. As a pressure balance valve.

Accordingly, reference is hereby made to the accompanying drawings wherein:

FIG. 1 is a view showing a pilot operated control valve constituting the present invention in its simplest form;

FIGS. 2 and 3 are sectional views taken respectively along the lines 2—2 and 3—3 of FIG. 1;

FIG. 4 is a view similar to FIG. 1 but showing a servo valve using a linear motor to drive the poppet;

FIGS. 5 and 6 are views taken respectively along the lines 5—5 and 6—6 of FIG. 4;

FIG. 7 is a view similar to FIG. 1 but showing the present invention in the form of a pressure regulator characterized by extreme accuracy of the regulated pressure for large variations of both the inlet pressure and the flow rate through the valve;

FIGS. 8 and 9 are sectional views taken respectively along the lines 8—8 and 9—9 of FIG. 7;

FIG. 10 shows a pressure balance valve constituting another embodiment of the present invention;

FIG. 11 is a sectional view taken along the lines 11—11 of FIG. 10;

Figure 1:
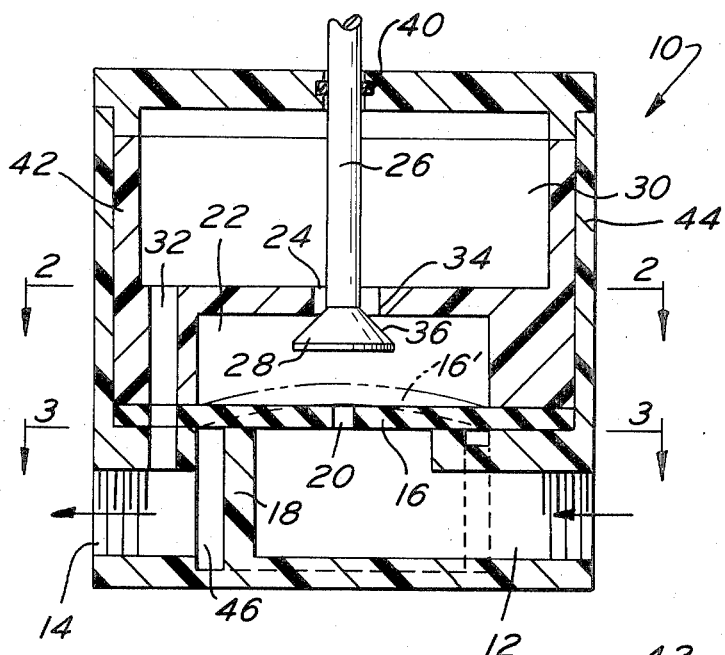
Figure 12:
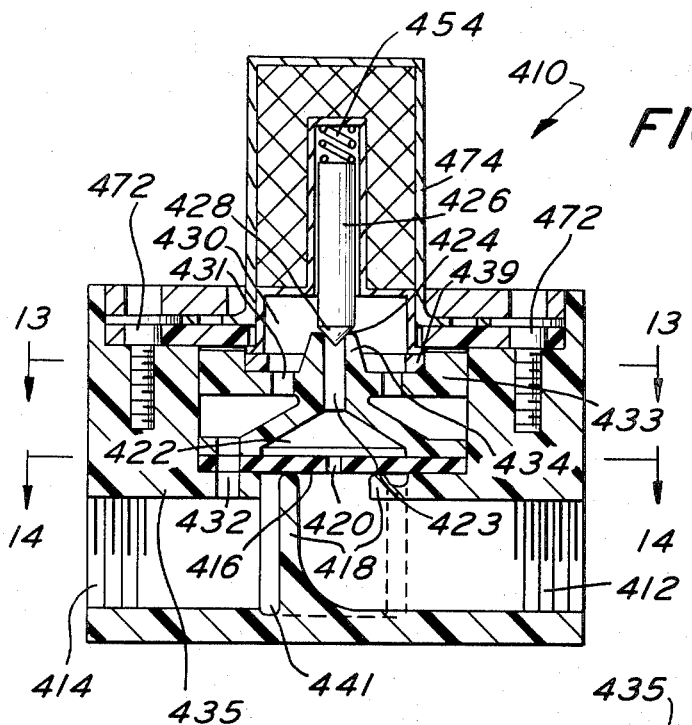
Figure 13:
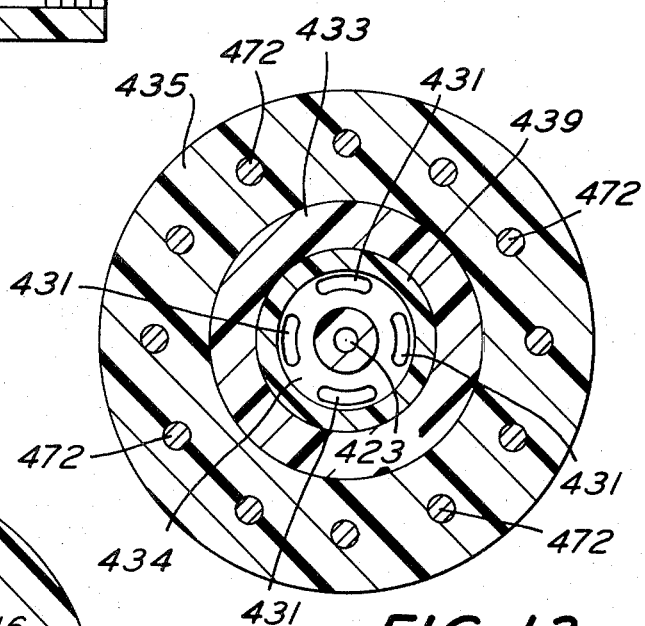
Figure 14:
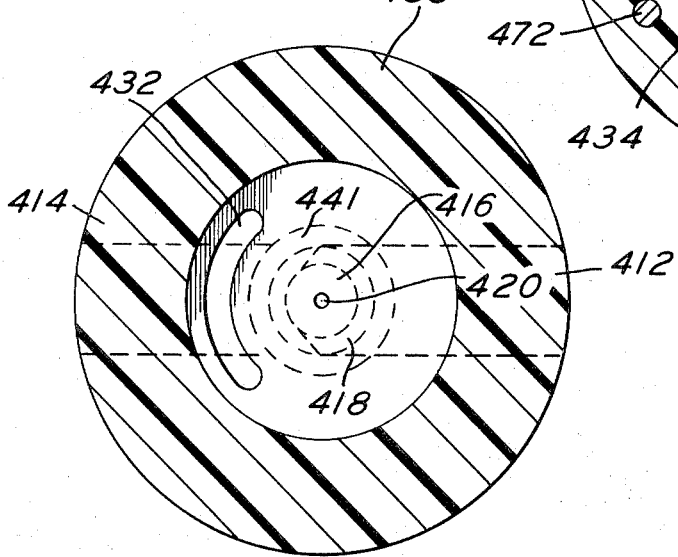

FIG. 12 shows yet another embodiment of the present invention, similar to the embodiment of FIG. 1, but containing certain improved characteristics; and FIGS. 13 and 14 are views taken respectively along the lines 13—13 and 14—14 of FIG. 12.

Referring now in greater detail to the various figures of the drawing wherein like reference characters refer to like parts, there is shown generally at 10 in FIG. 1 a pilot operated control valve constituting an embodiment of the invention. Device 10 includes main line 12 that flows through discharge line 14 when diaphragm 16 is lifted to the dashed position 16' and away from circular ledge 18. The diaphragm 16 has an orifice 20 that leads into a poppet chamber 22 that has an opening 24. A poppet 26 having poppet head 28 passes through the opening 24 where the poppet head 28 projects into poppet chamber 22. It will be seen that the effective area of opening 24 can be varied depending upon the position of poppet head 28 with respect to the opening 24. As further seen in FIG. 1, the opening 24 communicates with control chamber 30, and outlet means 32 are provided in order to connect the control chamber 30 with the discharge line 14.

When the bevelled edges 36 of the back side of the poppet head 28 are spaced away from walls 34 defining opening 24, the poppet 26 may be regarded as being off its seat. The resulting unbalanced pressure forces within the fluid passing through main line 12 act upon the outer side of the diaphragm 16 to lift it off its seat (away from ledge 18) by an amount L, where the unbalanced pressure forces are equal to the elastic forces in the strained diaphragm 16. Thus, the diaphragm 16 is caused to move under fluid pressure as allowed by the unseating of poppet head 28.

Simultaneously, a control flow is established from the main line 12 through orifice 20 in diaphragm 16. The control flow then passes into poppet chamber 22 and then passes through opening 24 (as allowed by the position of poppet 26) into the control chamber 30. The control flow then returns to the discharge line 14 through outlet 32.

Equating the flow through the area of the diaphragm orifice $A_o$, to the flow through the effective portion of opening 24, $A_c$, for uncompressible flow:

$$A_o \sqrt{P_s - P_d} = A_c \sqrt{P_d - P_c} \tag{1}$$

wherein:

$P_s$ is the supply pressure (pressure in main line);
$P_d$ is the pressure above the diaphragm (in poppet chamber 22); and
$P_c$ is the pressure in control chamber 30.

By making the flow area for the control flow ($A_c$) for the opening 32 large compared with the other restrictions in the control flow path (by making opening 32 at least 10 times as large in area as compared with opening 24), the control pressure (in chamber 30) is essentially equal to the discharge pressure of the valve in discharge line 14. Accordingly, a second equation which describes the amount by which the diaphragm lifts off its seat is:

$$P_s A_s + P_c(A_d - A_s) - P_d \cdot A_d = k \cdot L \tag{2}$$

wherein:

$A_s$ is the area of diaphragm 16 over which the pressure in the main line (supply pressure) acts;
$L$ is the lift of the diaphragm;
$A_d$ is the diaphragm area; and
$k$ is a proportionality constant.

Solving equation 1 for $P_d$ yields:

$$P_d = [P_c + P_s (A_o/A_c)^2]/[1 + (A_o/A_c)^2] \tag{1a}$$

Substituting this expression into equation 2:

$$kL/A_s = (P_s - P_c) \{1 - [(A_d/A_s)(A_o/A_c)^2]/[1 + (A_o/A_c)^2]\} \tag{3}$$

Accordingly, $L$, the lift of the diaphargm is proportional to $A_s$, $P_s - P_c$, and the quantity $$1 - [(A_d/A_s)(A_o/A_c)^2/(1 + (A_o/A_c)^2)]$$

For a given configuration, say where $A_d/A_s = 2$, this last term reduces to:

$$[1 - (A_o/A_c)^2]/[1 + (A_o/A_c)^2]$$

and $$\frac{kL}{As} = (P_s - P_c) \left\{ \frac{1 - \left(\frac{Ao}{Ac}\right)^2}{1 + \left(\frac{Ao}{Ac}\right)^2} \right\} \quad (3\text{-}a)$$

In accordance with equation (3-a), the deflection L of the diaphragm from its seat, for any (steady state) pressure condition, will vary linearly with the coefficient $[1 - (Ao/Ac)^2]/[1 + (Ao/Ac)^2]$ which in turn is determined by the controlled variable $A_c$. The following tabulation depicts the value of the coefficient for different values of the ratio of $Ao/Ac$:

| Ao/Ac | $[1-(Ao/Ac)^2]/[1+(Ao/Ac)^2]$ |
|---|---|
| 1 | 0=0 |
| 0.9 | 19/181=0.105 |
| 0.8 | 9/41=0.220 |
| 0.7 | 51/149=0.342 |
| 0.6 | 8/17=0.470 |
| 0.5 | 3/5=0.600 |
| 0.4 | 21/29=0.724 |
| 0.3 | 91/109=0.835 |
| 0.2 | 12/13=0.923 |
| 0.1 | 99/100=0.981 |

From the foregoing it can be seen that the coefficient $[1 - (Ao/Ac)^2]/[1 + (Ao/Ac)^2]$ can be varied from 0 to almost unity, which in turn means that the main flow area may be varied accordingly. Also, as the value of $A_c$ becomes large compared with $A_o$, there is generally a linear response in the aforesaid coefficient until the value of the ratio of $A_o$ to $A_c$ drops to about 3/10.

Figure 2:
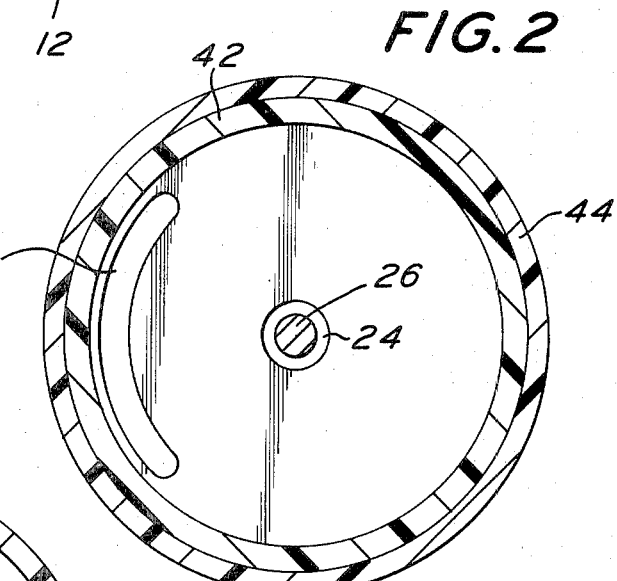
Figure 3:
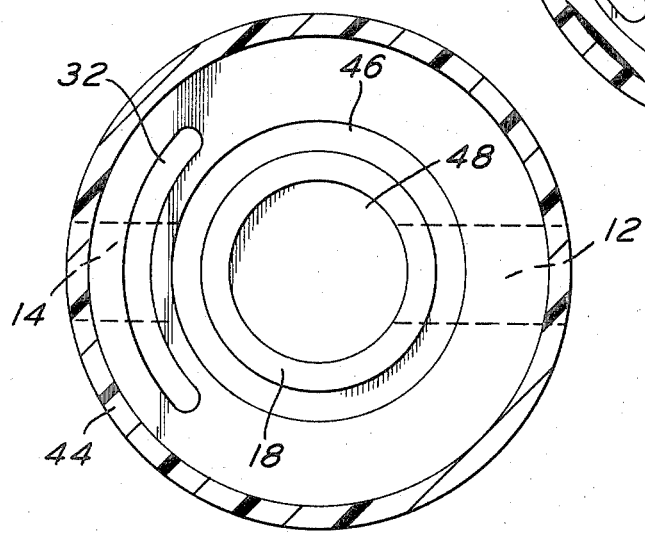

Before discussing the applications of the foregoing principles, reference is again made to FIG. 1 as well as FIGS. 2 and 3 to show certain details of the invention including sealing ring 40 for maintaining the control chamber 30 fluid tight. As can be seen in FIG. 2, the outlet 32 is formed adjacent a sleeve 42 which in turn is held within outer housing 44.

As seen in FIG. 3, a circular area passing about ledge 18 has been labelled as 46, with the ledge 18 defining area 48 which is the area of diaphragm 16 over which the supply pressure acts.

The foregoing mathematical analysis shows that the main flow area for the valve of the present invention is established by the ratio of the diaphragm orifice area to the effective area of opening 24 (control flow area) about the head 28 of the poppet 26.

Accordingly, the diaphragm orifice area can be made small to provide a small control orifice, with the result that small translations can be effected for the poppet against low pressure forces. The result is the subsequent control of the main flow with its attended large pressure forces.

In view of the foregoing, the present invention can be applied to servo valves, pressure regulators and pressure balance valves. In these applications, as a consequence of the gain which is inherent in the device, three results are respectively obtained:

1. The capability of controlling large amounts of power by the direct application of small amounts of power;

2. For a given size diaphragm and a particular spring (which supplies the reference force), extreme accuracy of regulation with respect to inlet pressure to the regulatr and flow rate from the regulator;

3. For a given size diaphragm, extreme accuracy of the control pressure for large differences in the supply pressures.

Furthermore, shut-off is obtained without requiring that the parts be in sliding, frictional contact. In this way the life of the part is greatly extended.

Reference is now made to FIGS. 4, 5 and 6 to show a servo-valve application of the present invention. In the device of FIGS. 4, 5 and 6 reference characters similar to FIGS. 1 to 3 have been used except that the embodiment of FIGS. 4, 5 and 6 will be known as device 110, and the other components are numbered in the 100 series. Thus, the main line has been numbered as 112 and the discharge line has been numbered as 114 and so on. It will be noted that the main line 112 makes an axial entrance rather than a side entrance as in FIG. 1.

The servo-valve of FIGS. 4, 5 and 6 utilizes a linear motor to drive the poppet 126. Although the bearings have been omitted for the sake of clarity, clearly any type of linear ball bearing or suspension system that is linearly compliant will be suitable. As shown in FIG. 4, a stator 150 that is magnetized through current flowing in wire 151 actuates armature 152 to which the poppet 126 is connected. A spring 154 is interposed in order to obtain the desired movement of the poppet 126. It will be appreciated that the combination of pressure, spring and electromagnetic forces acting upon the poppet 126 will establish the poppet's position. By suitably choosing the orifice area of the poppet, its mass, the spring constant and the armature magnetization, desired motion of the poppet head 128 is obtained. In this way, excellent valve transfer functions result from the device of FIGS. 4, 5 and 6.

Figure 7:
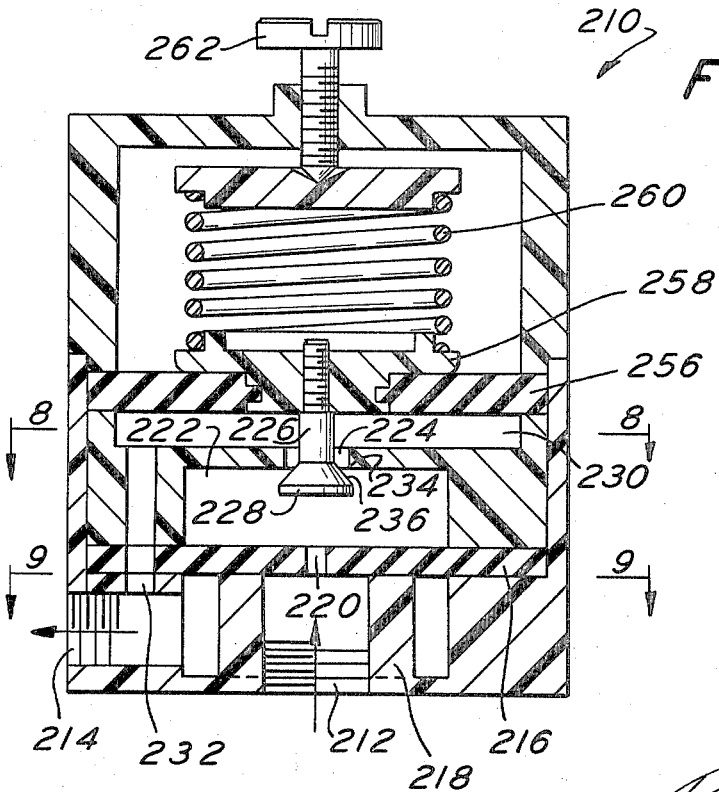
Figure 8:
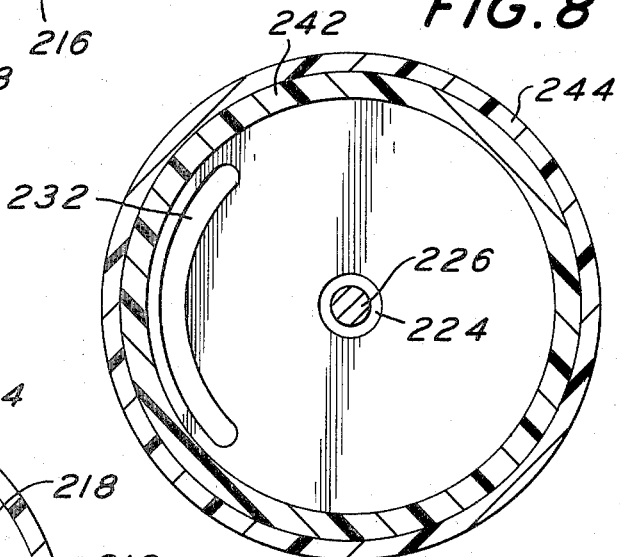
Figure 9:
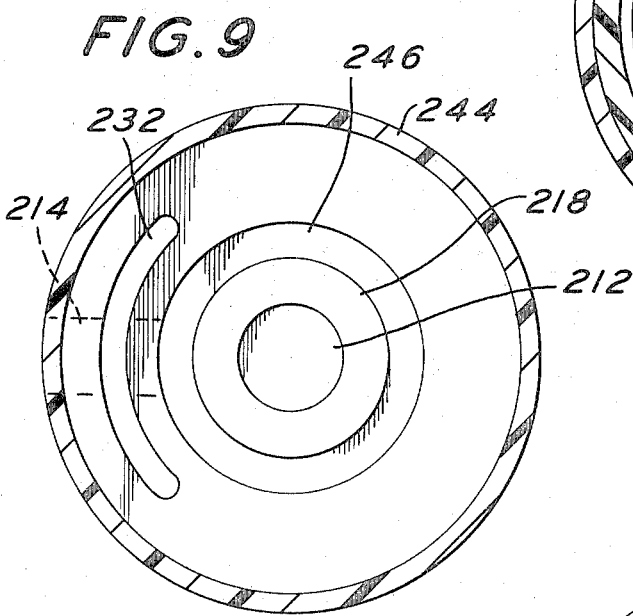

Attention is now called to the pressure regulator of FIGS. 7, 8 and 9 that is characterized by extreme accuracy of the regulated pressure for large variations of both the inlet pressure and the flow rate through the valve. This is inherent with the use of a pilot valve in device 210 of FIG. 7 for the control flow, actuated by a second diaphragm which senses the controlled pressure. As in FIGS. 4, 5 and 6, reference numerals of the 200 hundred series are used in FIGS. 7, 8 and 9.

It will be seen that the pilot valve of FIG. 7 controls the pressure which acts upon one side of the main flow diaphragm 216 and then establishes the main flow area for the valve.

Since the major part of the flow is through the main flow area, the pilot valve's flow area can be made very small, yielding a large ratio for the area of the control pressure sensing diaphragm 256 to the pilot valve flow area, thereby clearly contributing to the extreme accuracy of regulation.

As in FIG. 4, the flow in FIG. 7 is through axial main line 212, then dividing, with a small fraction (the control flow) flowing through orifice 220 of the main flow diaphragm 216. The remainder of the flow passes through the opening established when the diaphragm 216 is lifted away from ledge 218 by virtue of the control flow that is permitted to pass beyond the poppet head 228 and through control opening 224. The control flow then rejoins the main flow by passing through outlet means 232.

With reference to the control chamber 230, it will be seen that the pressure of the control flow acts upon supplemental diaphragm 256 (which is reinforced in its center by member 258). Again, as in the other embodiments, the flow area through outlet means 232 is quite large compared with the area of orifice 220 of the diaphragm 216 (10 to 1 or greater).

In view of the foregoing, it will be seen that the pressure sensed by the supplemental diaphragm 256 is essentially equal to the discharge pressure through outlet means 232.

The pressure in the poppet chamber 22 is determined by continuity requirements of the flow through diaphragm orifice 220 and control opening 224. This pressure in turn establishes the main flow area of the valve in that the diaphragm 216 moves in response to this pressure, in conjunction with the supply pressure in the main line 212 and the discharge pressure in discharge line 214.

The pressure forces acting upon supplemental diaphragm 256 are balanced by the force from spring 260 which is established by adjustable screw 262.

The operation of the device 210 can be understood by assuming a discharge pressure to discharge line 214 that is greater than that necessary to balance the spring force acting upon supplemental diaphragm 256. Thus, the spring 260 becomes compressed, and this causes the control opening 224 to become reduced. With the smaller area of control opening 224, there will be an increase in pressure in the poppet chamber 222. The net effect of this is to reduce the lift of main diaphragm 216. With a smaller lift of diaphragm 216, the flow through main line 212 is decreased, and this in turn reduces the discharge pressure to discharge line 214. The lower pressure in the discharge line 214 is then transmitted back to the supplemental diaphragm 256 which will urge the poppet head 228 away from the spring 260, thereby increasing the effective area of the control opening 224. In this way, a desired equilibrium is established.

Attention is now called to FIGS. 10 and 11 which show a pressure balance valve embodiment of the present invention. Reference is made to co-pending Application Ser. No. 54,542 for details of the pressure balance valves that are being claimed therein. For present purposes, it will be seen that the pressure balance valve 310 of FIGS. 10 and 11 includes main lines 312-A and 312-B, and discharge lines 314-A and 314-B. Diaphragms 316-A and 316-B are interposed to be lifted off ledges 318 by a control flow through diaphragm orifices 320.

The control flow then enters poppet chambers 322 to pass through control openings 324 into control chambers 330. It is to be noted that the poppets 326-A and 326-B are secured to one another and also to a common diaphragm 370, much in the manner of the diaphragms of said co-pending Application Ser. No. 54,542, filed July 13, 1970 and entitled "Pressure Balance Valve."

As in the previous embodiments, the control flow then passes through outlet means 332 to rejoin the remainder of the flow in discharge line 314.

It will be appreciated that the device of FIG. 10 can accept two liquids in the main lines 312-A and 312-B and discharge them at substantially equal pressures in the discharge lines 314-A and 314-B.

As a consequence of the gain of pressure balance valve 310, excellent accuracy can be obtained with high flow and small diameter. This is advantageous in that a smaller, more economical unit can be built for a given accuracy and flow rate than a more conventional diaphragm or piston-type of pressure balance valve. Also, this design combines the previously noted advantage of no parts in sliding, frictional contact. The entire device is simply held together using bolts 372.

It is sometimes desirable to provide each diaphragm 316-A and 316-B with integral check valve 373 to prevent the mixing of the fluids in the supply lines that are connected by the diaphragm orifices.

It will be appreciated that where a greater pressure exists, for instance, in main line 312-A, that the poppet head 326-A will be moved to reduce the effective opening 324. This, in turn, will decrease the lift of the diaphragm 316-A and will have the effect of decreasing the flow in discharge line 314-A. Furthermore, the common diaphragm 370 will be urged toward main line 312-B which will have the effect of increasing the effective area of the opening 324 through which poppet head 326-B acts. This, in turn, increases the flow to orifice 320 in diaphragm 316-B which increases the lift of the diaphragm and hence the flow rate to discharge line 314-B is accordingly increased.

Finally, attention is called to device 410 of FIG. 12. Here again, numbers in the 400 series have been used. The device 410 of FIG. 12 is similar in many respects to the basic device 10 of FIG. 1, except that the device 410 contains certain features that may be used in a commercial embodiment of the invention. It will be seen that the main line 412 leads to the diaphragm 416 that is supported on ledge 418. The diaphragm orifice 420 leads to the poppet chamber 422 which is of a conical shape. The poppet chamber 422 is connected by a passageway 423 to control opening 424 that may exist above walls 434.

In reviewing FIG. 12 it will be seen that the basic components of this embodiment of the invention include a body member 435 which receives securing bolts 472 in order to hold the entire device together.

The fluid passing through passageway 423 into control chamber 431 returns to discharge 14 through slots 431 (formed in walls 434 and thickness 433). A suitable seal 439 is provided.

The poppet 426 is resiliently mounted by virtue of spring 454 that is held within a recess of housing 474.

The diaphragm 416 is caused to lift away from the ledge 418 in the manner as previously described. A circular depression 441 is formed outwardly of the ledge 418 as shown in FIG. 12. The fluid passing through the slots 431 then rejoins the main flow by passing through aditional slots 432.

It is thus seen that the present invention provides a pilot operated control valve wherein the position of the poppet establishes the effective area of the control opening. The control in turn establishes the lift of the diaphragm which in turn determines the main flow.

Without further elaboration, the foregoing will so fully illustrate my invention that others may, by applying current or future knowledge, readily adapt the same for use under various conditions of service.

What is claimed as the invention is:

1. A pilot operated control valve for limiting flow between a main line and a discharge line, moveable diaphragm means interposed between the main line and said discharge line for directly establishing the flow therebetween as a function of its position, the diaphragm means having an orifice leading into a poppet chamber having an opening and outlet means, a poppet including a tapered portion passing through said opening and projecting into said chamber, a linear motor to drive said poppet, said motor including an armature to which said poppet is connected means for variably positioning said poppet in said opening in order to vary the effective area of said opening by the movement of said poppet, said outlet means having a maximum effective area of ten times the area of said opening, said opening leading to a control chamber, said outlet means connecting the control chamber to said discharge line whereby a small portion of the flow from the main line, which portion is denominated as the control flow and is a function of the area of the opening in the poppet chamber, is diverted through said diaphragm orifice, through said poppet opening, into said control chamber and then to said discharge line through said outlet means, the position of said diaphragm for any steady state condition varying linearly with the coefficient $[1-(A_o/A_c)^2]/[1+(A_o/A_c)^2]$ wherein $A_o$ is the area of the opening in the poppet chamber and $A_c$ is the area of the outlet means.

2. The pilot operated control valve of claim 1 wherein said poppet is spring biased.

* * * * *